United States Patent [19]

Wunderling et al.

[11] Patent Number: 4,987,195
[45] Date of Patent: Jan. 22, 1991

[54] POLYACRYLAMIDE GELS AND METHOD FOR THE PREPARATION OF POLYACRYLAMIDE GELS

[75] Inventors: Martin Wunderling, Friedberg; Lothar Rupp, Aldingen, both of Fed. Rep. of Germany

[73] Assignee: Hewlett-Packard Company, Palo Alto, Calif.

[21] Appl. No.: 324,290

[22] Filed: Mar. 15, 1989

[30] Foreign Application Priority Data

Apr. 9, 1988 [EP]  European Pat. Off. ......... 88105677.4

[51] Int. Cl.$^5$ .................... C08F 8/12; C08F 8/30
[52] U.S. Cl. .................... 525/329.4; 525/380; 525/384; 525/386; 8/647
[58] Field of Search .............. 524/555; 525/329.4, 525/380, 384, 647, 386

[56] References Cited

U.S. PATENT DOCUMENTS

| 3,839,255 | 10/1974 | Podlas ........................... 260/29.6 |
| 4,194,877 | 3/1980 | Peterson ........................... 8/4 |
| 4,801,655 | 1/1989 | Murray, Jr. et al. ............... 525/369 |

FOREIGN PATENT DOCUMENTS 1020355  3/1984  United Kingdom.
2139632A 3/1984  United Kingdom.

OTHER PUBLICATIONS

Morrison & Boyd, *Organic Chemistry*, 3rd ed., Jun. 1979, p. 1113.

*Primary Examiner*—Joseph L. Schofer
*Assistant Examiner*—Thomas McDonald, Jr.

[57] ABSTRACT

Polyacrylamide gels containing bound dye indicator molecules being sensitive to pH variation are treated with an aqueous solution for a period of time until the shifting of the pK value of the gel, due to the treatment, has finished.

5 Claims, 1 Drawing Sheet

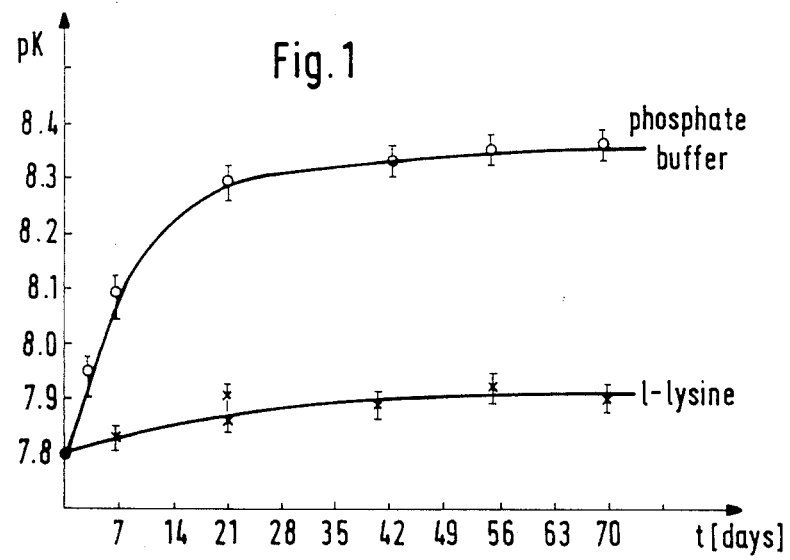
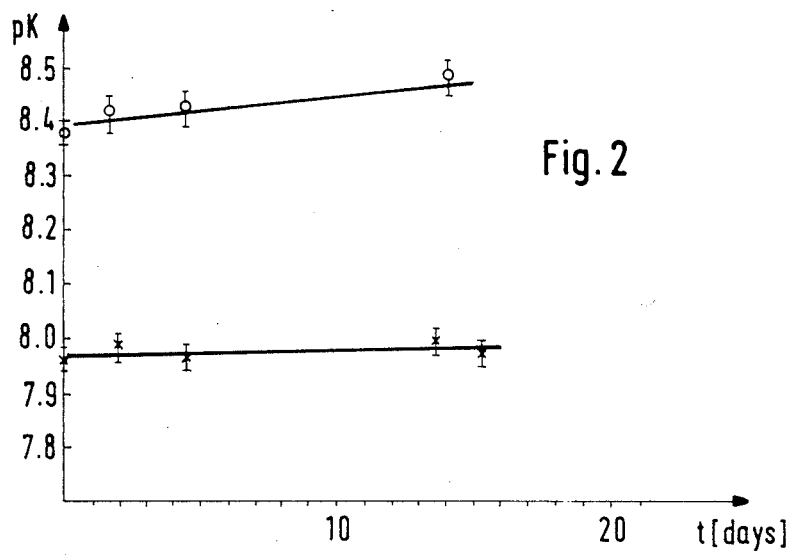

POLYACRYLAMIDE GELS AND METHOD FOR THE PREPARATION OF POLYACRYLAMIDE GELS

DESCRIPTION

The present invention relates to polyacrylamide gels containing bound dye indicator molecules being sensitive to pH variation, said indicator molecules were bound by polymerization of acrylamides and said indicator molecules. The invention further relates to a method for the preparation of polyacrylamide gels containing bound dye indicator molecules being sensitive to pH variation, said method comprising the step of a polymerization of acrylamides and indicator molecules.

Polyacrylamide gels containing bound dye indicator molecules being sensitive to pH variation are disclosed within US-A 4 194 877 (J. I. Petersen). Dye indicators are used for pH measurement. Such a dye behaves as a weak acid and exists in an acid and a basic form, each having a different light absorption spectrum. As the pH of the solution varies, the relative size of each form's optical absorption peak varies in proportion to the changing relative concentrations of the acid and basic forms of the dye. Thus, the optical absorption of the dye solution at one of these peak wavelengths can be used for measuring pH.

Indicator dyes such as phenol red, chlorphenol red, cresol red and s.o. are soluble in aqueous mediums.

For pH measurements with stationary probes, the dye indicator molecules are bound by polymerization with a monomer such as an acrylamide to the resulting polymer matrix.

A fiber optic pH probe for physiological use is described, for example, by J. I. Petersen et al., Analytical Chemistry, Vol. 52, 856–869 (1980). The probe is designed of a thin tubing, being insertable, for example, into veines of a human body. Within the tubing is positioned a polyacrylamide gel body containing bound dye indicator molecules. Optical fibers are in contact with the gel body. A reflector is provided at the terminal end of the probe, for reflecting light being emitted from the optical fibers and having passed the gel body. The tubular housing of the probe is designed as a semipermeable wall or provided with openings allowing a diffusion of molecules to be measured (for example $O_2$, $CO_2$, or hydrogen) into the gel body. So, the gel body is in connection with the medium to be measured, and the open hydrophilic gel structure allows a ionic diffusion to the dye molecules, covalently bound to the polymer matrix.

pH can be expressed as a function of the pK of the indicator, the total dye concentration (T), and the concentration of the base form of the indicator (A-):

$$pH = pK - \log\left[\frac{(T)}{(A^-)} - 1\right] \quad (1)$$

(Equation of Henderson-Hasselbalch)

The relation between the intensity of transmitted light at the peak absorption wavelength of the base form of the dye and pH can be developed by combination of the equation of Henderson-Hasselbalch with the Lambert-Beer relation:

$$\log\left(\frac{I_o}{I}\right) = (A^-) \cdot L \cdot \epsilon \quad (2)$$

(Lambert-Beer)

I and $I_o$ are the transmitted intensities at the absorption wavelength, and $I_o$ represents the transmittance in the absence of any base form of the dye. L is the length of the effective light path through the dye and $\epsilon$ the absorption coefficient of the base tautomere.

Therefore, substitution of (A-) in the equation of Henderson-Hasselbalch by the equation of Lambert-Beer provides Equation 3:

$$pH = pK - \log\left[\frac{(T) \cdot \epsilon \cdot L}{\log\left(\frac{I_o}{I}\right)} - 1\right] \quad (3)$$

Here, pH is related to I, the value to be measured by the fiber optic probe. The constants (T), $\epsilon$, L, and $I_o$ can be combined into a single constant.

Furthermore, the pK value is a constant, so a measurement of I leads directly to the pH value.

The pH value of the blood of an healthy human is about 7.38. A deviation from the normal pH value 7.38 indicates a state of disease of the human. Human blood has the properties of a pH buffer, so a deviation in the range of 0.2 to 0.5 from the normal value indicates a serious pathological situation of the human. Therefore, a sensitive and accurate measurement of pH deviation is necessary.

It has been recognized that measurements in aqueous solutions having a constant pH with fiber optic pH probes having polyacrylamide gels containing bound dye indicator molecules nevertheless indicate a shift of the pH value up to 0.4 units on measuring about a period of several days. So such probes are not useful for pH measurements in a human body, for example during a surgical operation and several days thereafter.

It is, therefore, object of the present invention to provide polyacrylamide gels containing bound dye indicator molecules, said gels allowing an exact pH measurement in particular over a period of several days.

According to one aspect of the invention, a method for the preparation of polyacrylamide gels containing bound dye indicator molecules being sensitive to pH variation, said method comprising the step of a polymerization of acrylamides and said indicator molecules characteristics comprises the step of treating said gels with an aqueous solution for a period of time until the shifting of the pK value of the gel due to the treatment has finished.

According to another aspect of the invention, a polyacrylamide gel containing bound dye indicator molecules being sensitive to pH variation, said indicator molecules were bound by polymerization of acrylamides and indicator molecules is characterized in that this particular amido groups of the polyacrylamide gel being hydrolizable by aqueous solution having a preselected pH value are hydrolized completely.

It has been found out that the erroneously indicated shift of the pH value is caused by a shift of the pK value of the polyacrylamide gel. It is assumed that several amido groups of the polyacrylamide matrix are hydrolized by replacing the amino group by an OH group. The resulting carboxylic group may undergo an intramolecular hydrogen bond with the hydrogen atom of the indicator OH group. This replacement results in a change of the pK value of the bound indicator molecules. For example, the pK value of phenol red as a dye indicator bound to a polyacrylamide shifts during treatment with an aqueous phosphate buffer solution during three weeks from 7.8 to 8.3. After that period of three weeks, no further change or shifting of the pK value occurs. Therefore, a "pre-conditioning" according to the present invention of usually prepared polyacrylamide gels containing bound dye indicator molecules results in gels having a constant pK value.

According to another aspect of the invention, the treatment of the polyacrylamide gels occurs within aqueous solutions further comprising an α-amino carboxylic acid, in particular histidine, preferably L-histidine and/or lysine, preferably L-lysine. It has been recognized that in the presence of α-amino carboxylic acids, for example with L-histidine and/or L-lysine, the shift of the pK value only occurs in the range of 0.1. It has been found out that the α-amino carboxylic acids were bound to the polymer matrix during the treatment according to the invention. It is assumed that the amino groups, in particular this amino groups positioned adjacent to the OH-group of the indicator molecules, are not replaced by a hydroxyl group but enter into a chemical binding with the α-amino carboxylic acids. Therefore, no intramolecular hydrogen bond of a carboxylic (COOH) group adjacent to the hydroxyl group of the indicator molecules is possible. For example, a treatment of polyacrylamide containing bound phenol red with a L-lysine containing aqueous medium results in a pK shift from 7.8 to 7.9 after three weeks. Such "preconditioned" gels have a constant pK value after said period of time, also if further treating with other aqueous solutions. Such "preconditioned" gels are in particular useful for pH measurement of biological samples because of the pK value of 7.9 is in the range of the pH value of such samples. This results in high-sensitive fiber optic pH probes containing such "preconditioned" gels.

Furthermore, gels containing bound L-lysine molecules are insensitive to bivalent cations such as magnesium ions. Bivalent ions form complexes with the carboxylic group (COO-) obtained by the hydrolysis of the amido group (P. Mallo et al., "Extent and effects of hydrolysis in polyacrylamide gels", Polymere Communications, Vol. 36, Aug. 1985).

If the complex between the carboxylic group (COO-) and the bivalent cation is more stable than the intramolecular hydrogen bond between the carboxylic group (COO-) and the hydrogen of the hydroxylic group of the indicator molecule, said intramolecular hydrogen bond is released. As a result, a change of the pK value occurs.

Therefore, histidine and lysine treated polyacrylamide gels having no carboxylic group adjacent to the OH-group of the indicator molecule are insensitive to bivalent cations.

Some embodiments of the present invention will now be described with reference to the accompanying drawings in which:

FIGS. 1 and 2 show diagrams demonstrating the extent of the pK shift of polyacrylamide gels, treated according to the invention.

EXAMPLE 1

4.265 g (60.0 mM) acrylamide, 0.0962 g (0.6 mM) bisacrylamide, and 0.05 g (0.1412 mM) phenol red are dissolved in 10 ml water at 50° C. After cooling to 0° C., 0.0483 g (0.2118 mM) of solid ammonium persulfate are added. The mixture is kept about 7 hours at 40° C. After that time, a gel is obtained, having the form of the reaction vessel.

EXAMPLE 2

The gel pieces obtained in Example 1 are given in aqueous solutions having pH 7.1. The gel pieces are incubated at 45° C. for several days, said gel pieces having a start pK value of 7.78.

TABLE 1 pK values of polyacrylamide gels containing bound phenol red after incubation at 45° C. in different aqueous solutions

| Solution | Incubation time (days) | pK |
|---|---|---|
| Sodium chloride, 150 mM | 6 | 8.02 |
| NaCl, 125 mM; Bicarbonate 25 mM | 21 | 8.20 |
| Phosphate buffer, 67 mM | 6 | 8.10 |
| Ascorbic acid, 75 mM | 6 | 7.98 |
| Ca-Lactate, 75 mM | 6 | 8.07 |
| Sodium citrate, 150 mM | 6 | 8.19 |
| L-Histidine, 150 mM | 6 | 7.84 |
| L-Lysine, 150 mM | 6 | 7.79 |

The bicarbonate solution was adjusted to pH 7.1 by passing a gas mixture of carbondioxide ($CO_2$) and nitrogen ($N_2$) into said solution. The other solutions are adjusted to pH 7.1 by means of NaOH or HCl.

The pK values are measured with a Hewlett-Packard 8451A Diode Array Spectrophotometer.

As can be seen from Table 1, the shift of the pK value of the gel pieces, being treated with solutions containing the α-amino carboxylic acids, L-lysine or L-histidine is less than the shift of the other samples.

FIG. 1 shows the relationship between incubation time and pK shift of the gel samples being treated with the phosphate buffer solution and the L-lysine containing solution.

As already indicated in Table 1, the shift of the lysine sample is less pronounced than shift of the phosphate buffer sample.

Within both samples, the shift of the pK value is finished after 3 weeks, reaching its final pK value.

A treatment with elevated temperatures up to 55° C. results in shorter periods of time for reaching the final pK. Furthermore, a treatment in solutions having a pH above 7 up to 12 also results in shorter periods for reaching the final pK value. A treatment in buffered solutions assures a pH constant storage of the gel samples.

EXAMPLE 3

Gel pieces, first incubated for 8 weeks at 45° C. (pH 7.1) in a phosphate buffer solution as described in Example 2 are incubated in the biocarbonate buffer (pH 9) at 45° C. The bicarbonate buffer contains 25 mM bicarbonate and 125 mM NaCl.

A second sample of gel pieces, being first incubated for 8 weeks at 45° C. (pH 7.1) in a L-lysine-containing solution are further incubated in a bicarbonate buffer (pH 9), as described before.

Within FIG. 2, the pK value of said gel pieces is plotted versus the incubation time.

The pK value of the gel pieces, being preconditioned in phosphate buffer and having a final pK of about 8.4 shifts in a minimum range within the first 3 days of treatment. After that period of time, no further shift occurs.

Within the gel pieces, first incubated in L-lysine containing solutions, no further shift of pK value occurs. The pK value of said gel pieces is insensitive to both variation of kind of aqueous medium and variation of pH of said medium.

So, the gel pieces being first incubated, i.e. "preconditioned", can be used for exact pH measurements within optic fiber pH probes.

EXAMPLE 4

A fiber optic pH probe having incorporated a polyacrylamide gel containing bound phenol red, said gel was first "pre-conditioned" for 8 weeks as described in Example 2, is inserted in a solution containing a bicarbonate buffer having pH 7.32 (25 mM bicarbonate, 125 mM NaCl). After adding of 3 mM magnesium chloride ($MgCl_2$) to this solution, a minimum pH shift of about 0.01 results. The shift is within the tolerance of the measuring device.

So, the fiber optic pH probe having a lysine "preconditioned" gel is also insensitive to bivalent cations.

EXAMPLE 5

Polyacrylamide gels, incubated in L-lysine containing solutions as described in Example 2 are washed with water and centrifuged. This treatment is repeated six times until no non-bound lysine is incorporated within the gel. The so prepared gel was treated with 6n HCl and analyzed by GC. 1% by weight of dry gel was L-lysine. So the lysine is chemical bound to the polyacrylamide gel matrix.

We claim:

1. A method for preparing pH sensitive, prestabilized polyacrylamide gels having a dye indicator therein comprising the steps of:
   providing a supply of a polymerizable acrylamide and a dye indicator;
   combining said dye indicator and said polymerizable acrylamide to form a polyacrylamide gel containing said dye indicator, said polyacrylamide gel having a plurality of reactive groups thereon, said reactive groups being subject to hydrolysis during the use of said gel, said hydrolysis causing undesired intramolecular side reactions between said gel and said dye indicator, said side reactions causing a shift in the pK value of said gel over time, said shift diminishing the accuracy of said gel as a pH indicator; and
   binding a chemical binding agent to said reactive groups in order to prevent said hydrolysis of said reactive groups and to prevent said intramolecular side reactions from occurring, said chemical binding agent having a pH of about 7–12 and comprising at least one alpha-amino carboxylic acid selected from the group consisting of L-histidine and L-lysine.

2. The product of the method of claim 1.

3. A method for preparing pH sensitive, prestabilized polyacrylamide gels having a dye indicator therein comprising the steps of:
   providing a supply of a polymerizable acrylamide and a dye indicator;
   combining said dye indicator and said polymerizable acrylamide to form a polyacrylamide gel containing said dye indicator, said polyacrylamide gel having a plurality of reactive groups thereon, said reactive groups being subject to hydrolysis during the use of said gel, said hydrolysis causing undesired intramolecular side reactions between said gel and said dye indicator, said intramolecular side reactions causing a shift in the pK value of said gel over time, said shift diminishing the accuracy of said gel as a pH indicator; and
   binding a chemical binding agent to said reactive groups in order to prevent said hydrolysis of said reactive groups and to prevent said intramolecular side reactions from occurring, said binding agent comprising at least one alpha-amino carboxylic acid.

4. The method of claim 3 wherein said alpha-amino carboxylic acid is selected from the group consisting of L-histidine and L-lysine.

5. The product of the method of claim 3.